United States Patent
Motakef et al.

(10) Patent No.: US 9,719,423 B2
(45) Date of Patent: Aug. 1, 2017

(54) INLET AIR CHILLING SYSTEM WITH HUMIDITY CONTROL AND ENERGY RECOVERY

(75) Inventors: Abbas Motakef, Johns Creek, GA (US); Bhalchandra Arun Desai, Smyrna, GA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 854 days.

(21) Appl. No.: 13/602,363

(22) Filed: Sep. 4, 2012

(65) Prior Publication Data
US 2014/0060774 A1 Mar. 6, 2014

(51) Int. Cl.
*B60H 3/00* (2006.01)
*F02C 7/047* (2006.01)
*F02C 7/143* (2006.01)
*F02C 7/052* (2006.01)

(52) U.S. Cl.
CPC .............. *F02C 7/047* (2013.01); *F02C 7/052* (2013.01); *F02C 7/143* (2013.01); *F05D 2260/205* (2013.01); *F05D 2260/213* (2013.01)

(58) Field of Classification Search
CPC ........ F25B 29/00; F25B 49/02; F25B 43/003; F25B 2700/02; F25B 2700/21; F25B 2700/2106; F02C 7/08; F02C 1/00; F02C 7/052; F02K 3/08; F01D 25/08; F25D 9/00; B01D 46/42; B01D 46/0023; B01D 46/003; B01D 46/0087; B01D 46/4263; F28D 21/0012; F28D 21/0014
USPC ........................................ 165/48.1
See application file for complete search history.

(56) References Cited

U.S. PATENT DOCUMENTS

| | | | |
|---|---|---|---|
| 3,698,204 A | 10/1972 | Schlotterbeck et al. | |
| 3,938,348 A | 2/1976 | Rickert | |
| 4,189,929 A * | 2/1980 | Russell | 62/175 |
| 4,267,967 A * | 5/1981 | Beck et al. | 236/49.3 |
| 4,373,576 A * | 2/1983 | Strupczewski | 165/48.1 |
| 4,715,871 A | 12/1987 | Uratani | |
| 4,819,444 A | 4/1989 | Meckler | |
| 4,876,858 A | 10/1989 | Shaw et al. | |
| 4,903,503 A | 2/1990 | Meckler | |
| 4,926,620 A * | 5/1990 | Donle | 95/202 |
| 4,942,740 A | 7/1990 | Shaw et al. | |
| 4,959,970 A | 10/1990 | Meckler | |
| 4,987,748 A | 1/1991 | Meckler | |

(Continued)

FOREIGN PATENT DOCUMENTS

| | | |
|---|---|---|
| CN | 1060270 A | 4/1992 |
| EP | 0269399 | 6/1988 |

(Continued)

OTHER PUBLICATIONS

Chinese Office Action dated Apr. 21, 2017 for Application No. CN 201310469455.3.

*Primary Examiner* — Travis Ruby
(74) *Attorney, Agent, or Firm* — Eversheds Sutherland (US) LLP

(57) ABSTRACT

An inlet air chilling system for use with a gas turbine engine is disclosed. The inlet air chilling system may include an inlet air filter house, an air chilling/heating coil positioned within the inlet air filter house, and an energy recovery/heating coil positioned downstream of the air chilling/heating coil within the inlet air filter house and in communication with the air chilling/heating coil.

10 Claims, 2 Drawing Sheets

(56) References Cited

U.S. PATENT DOCUMENTS

| | | | |
|---|---|---|---|
| 4,987,750 A | 1/1991 | Meckler | |
| 5,083,423 A * | 1/1992 | Prochaska et al. | 60/772 |
| 5,131,238 A | 7/1992 | Meckler | |
| 5,181,387 A | 1/1993 | Meckler | |
| 5,203,161 A | 4/1993 | Lehto | |
| 5,309,725 A * | 5/1994 | Cayce | F24F 3/1405 62/173 |
| 5,329,782 A | 7/1994 | Hyde | |
| 5,390,505 A | 2/1995 | Smith et al. | |
| 5,471,852 A | 12/1995 | Meckler | |
| 5,509,272 A | 4/1996 | Hyde | |
| 5,564,277 A | 10/1996 | Martin | |
| 5,613,372 A | 3/1997 | Beal et al. | |
| 5,647,225 A | 7/1997 | Fischer et al. | |
| 5,664,425 A | 9/1997 | Hyde | |
| 5,665,146 A | 9/1997 | Mizobe | |
| 5,752,389 A | 5/1998 | Harper | |
| 5,791,984 A | 8/1998 | Kane | |
| 5,816,315 A | 10/1998 | Stark | |
| 5,901,565 A | 5/1999 | Morton, Jr. | |
| 5,913,360 A | 6/1999 | Stark | |
| 5,953,926 A * | 9/1999 | Dressler et al. | 62/175 |
| 6,055,818 A | 5/2000 | Valle et al. | |
| 6,109,339 A * | 8/2000 | Talbert et al. | 165/48.1 |
| 6,134,903 A | 10/2000 | Potnis et al. | |
| 6,250,064 B1 | 6/2001 | Tomlinson et al. | |
| 6,293,121 B1 | 9/2001 | Labrador | |
| 6,318,065 B1 | 11/2001 | Pierson | |
| 6,389,825 B1 | 5/2002 | Wightman | |
| 6,470,686 B2 | 10/2002 | Pierson | |
| 6,497,757 B2 * | 12/2002 | Wakamatsu et al. | 96/290 |
| 6,711,907 B2 | 3/2004 | Dinnage et al. | |
| 6,769,258 B2 | 8/2004 | Pierson | |
| 6,848,267 B2 | 2/2005 | Pierson | |
| 6,854,279 B1 | 2/2005 | Digiovanni et al. | |
| 6,895,774 B1 | 5/2005 | Area et al. | |
| 6,955,057 B2 | 10/2005 | Taras et al. | |
| 6,964,168 B1 | 11/2005 | Pierson et al. | |
| 7,047,751 B2 | 5/2006 | Dinnage et al. | |
| 7,343,746 B2 | 3/2008 | Pierson | |
| 7,448,224 B2 | 11/2008 | Wu et al. | |
| 7,648,564 B2 | 1/2010 | Chillar et al. | |
| 7,779,643 B2 | 8/2010 | Simons | |
| 7,963,095 B2 | 6/2011 | Chillar et al. | |
| 7,984,566 B2 | 7/2011 | Staples | |
| 8,033,122 B2 | 10/2011 | Bean, Jr. | |
| 8,201,411 B2 | 6/2012 | Feher | |
| 2002/0017095 A1 | 2/2002 | Pierson | |
| 2003/0121271 A1 | 7/2003 | Dinnage et al. | |
| 2004/0011046 A1 | 1/2004 | Pierson | |
| 2004/0060315 A1 | 4/2004 | Dinnage et al. | |
| 2004/0261436 A1 | 12/2004 | Taras et al. | |
| 2005/0050906 A1 | 3/2005 | Dinnage et al. | |
| 2005/0056023 A1 | 3/2005 | Pierson | |
| 2005/0120715 A1 | 6/2005 | Labrador | |
| 2006/0053819 A1 | 3/2006 | Wu et al. | |
| 2006/0112825 A1* | 6/2006 | Renwart et al. | 95/273 |
| 2007/0012060 A1 | 1/2007 | Simons | |
| 2007/0294984 A1* | 12/2007 | Chillar et al. | 55/314 |
| 2008/0098891 A1 | 5/2008 | Feher et al. | |
| 2008/0155985 A1 | 7/2008 | Labrador | |
| 2009/0205354 A1 | 8/2009 | Brown | |
| 2009/0223240 A1 | 9/2009 | Bean, Jr. | |
| 2009/0282840 A1 | 11/2009 | Chen et al. | |
| 2010/0050873 A1* | 3/2010 | Hiner et al. | 95/283 |
| 2010/0101209 A1 | 4/2010 | Feher et al. | |
| 2010/0146930 A1 | 6/2010 | Motakef et al. | |
| 2010/0146976 A1 | 6/2010 | Motakef et al. | |
| 2010/0146978 A1 | 6/2010 | Feher et al. | |
| 2010/0146981 A1 | 6/2010 | Motakef et al. | |

FOREIGN PATENT DOCUMENTS

| | | |
|---|---|---|
| WO | 87/05683 | 9/1987 |
| WO | 88/08947 | 11/1988 |
| WO | 95/10742 | 4/1995 |
| WO | 2004/055443 | 7/2004 |
| WO | 2005/005896 | 1/2005 |
| WO | 2006/078315 A1 | 7/2006 |
| WO | 2007/096656 | 8/2007 |
| WO | 2009/111243 | 9/2009 |

* cited by examiner

INLET AIR CHILLING SYSTEM WITH HUMIDITY CONTROL AND ENERGY RECOVERY

TECHNICAL FIELD

The present application and the resultant patent relate generally to gas turbine engines and more particularly relate to an inlet air chilling and heating system for use with a gas turbine engine including humidity control and energy recovery for increased overall output and thermal efficiency.

BACKGROUND OF THE INVENTION

The power output of a gas turbine engine is proportional to the mass flow rate of the compressed airflow leaving the compressor. The compressor has a fixed capacity for handling a volumetric flow rate of the airflow at a given rotational speed. The mass flow rate of the airflow decreases with an increase in ambient temperatures because the density of the air decreases as the temperature increases. The efficiency and power output of the gas turbine engine thus decreases with increases in ambient temperatures.

One of the known techniques to augment power output includes reducing the temperature of the inlet airflow. A power augmentation system may include a chiller coil and/or an evaporative cooler so as to reduce the temperature of the incoming airflow. The use of a power augmentation system, however, may add resistance to the airflow entering the compressor. This resistance may be defined as a pressure drop in the inlet air system. Turbine efficiency and power output also are a function of the inlet system pressure drop. The higher the inlet system pressure drop, the lower the efficiency and overall power output of the turbine. Moreover, adding a power augmentation system to existing gas turbines generally involves considerable downtime for such an extensive retrofit.

Other causes of higher inlet system pressure drops include caking of the inlet filters during highly humid ambient conditions as well as during fogging conditions. Inlet air heating may be used so as to reduce the humidity ratio of the inlet air during those conditions. As above, however, raising the inlet air temperature generally leads to a reduction in power generation capacity, especially at base load conditions. Also, when the inlet chilling/heating coils are located upstream of the air filter elements to reduce cost and eliminate the need for gas turbine downtime, caking may develop on the filter elements during the inlet air chilling operation when the water is condensed and inlet air humidity ratio approaches one hundred percent (100%). To avoid such caking, which may lead to a higher inlet pressure drop and gas turbine shutdown, the inlet air chilling/heating coils generally are installed downstream of the final filters.

There is thus a desire for an improved inlet air chilling system. Such an improved inlet air chilling system may provide for both inlet air temperature and humidity control and, hence, avoid caking and the like while providing overall increased efficiency and power output. Moreover, such an improved system may be a retrofit without the need for extensive downtime and expense.

SUMMARY OF THE INVENTION

The present application and the resultant patent thus provide an inlet air chilling system for use with a gas turbine engine. The inlet air chilling system may include an inlet air filter house, an air chilling/heating coil positioned within the inlet air filter house, and an energy recovery/heating coil positioned downstream of the air chilling/heating coil within the inlet air filter house and in communication with the air chilling/heating coil.

The present application and the resultant patent further provide a method of conditioning a flow of inlet air for a gas turbine engine. The method may include the steps of flowing a flow of water through a chilling/heating coil, cooling the flow of air below a dew point with the flow of chilled water in the chilling/heating coil, flowing the flow of spent warm water though an energy recovery/heating coil, and heating the flow of air to reduce a humidity level therein with the flow of water in the energy recovery/heating coil.

The present application and the resultant patent further provide an inlet air chilling system for use with a gas turbine engine. The inlet air chilling system may include an inlet air filter house, a multipass air chilling/heating coil positioned within the inlet air filter house, a mist eliminator positioned downstream of the multipass air chilling coil within the inlet filter house, and an energy recovery/heating coil positioned downstream of the mist eliminator within the inlet air filter house and in communication with the multipass air chilling/heating coil.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
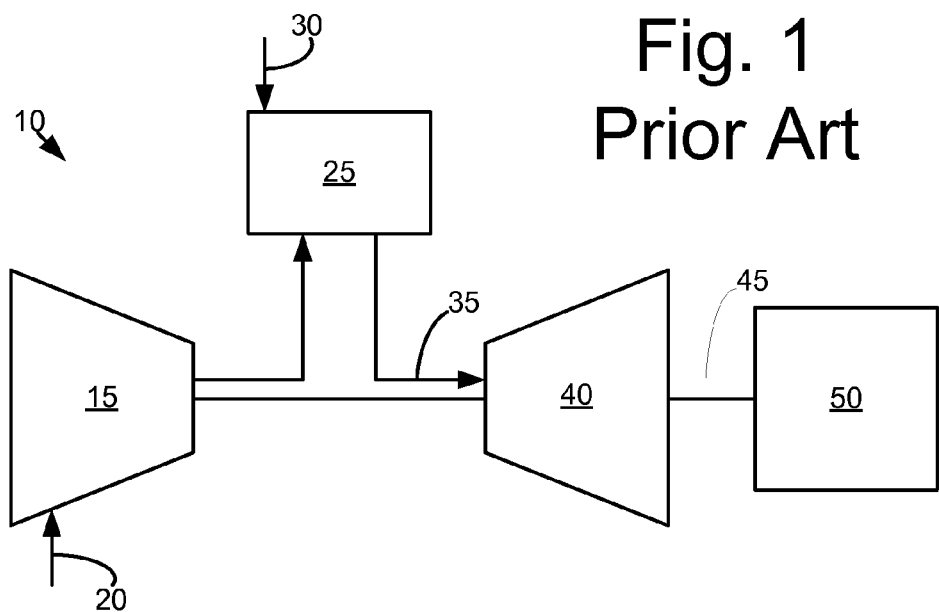
FIG. 1 is a schematic diagram of a gas turbine engine showing a compressor, a combustor, and a turbine.

Referring now to the drawings, in which like numerals refer to like elements throughout the several views, FIG. 1 shows a schematic view of gas turbine engine 10 as may be used herein. The gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a pressurized flow of fuel 30 and ignites the mixture to create a flow of combustion gases 35. Although only a single combustor 25 is shown, the gas turbine engine 10 may include any number of combustors 25. The flow of combustion gases 35 is in turn delivered to a turbine 40. The flow of combustion gases 35 drives the turbine 40 so as to produce mechanical work. The mechanical work produced in the turbine 40 drives the compressor 15 via a shaft 45 and an external load 50 such as an electrical generator and the like.

The gas turbine engine 10 may use natural gas, various types of fuel oils, various types of syngas, and/or other types of fuels. The gas turbine engine 10 may be any one of a number of different gas turbine engines offered by General Electric Company of Schenectady, N.Y., including, but not limited to, those such as a 7 or a 9 series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together.

Figure 2:
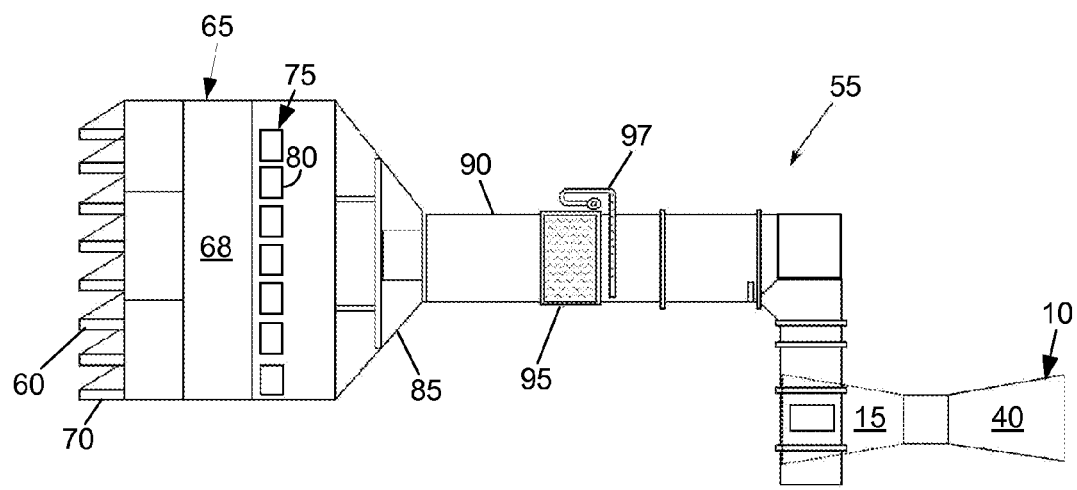
FIG. 2 is a schematic diagram of a gas turbine engine with an air inlet system.

FIG. 2 shows an inlet air system 55 that may be used with the gas turbine engine 10 and the like. The inlet air system 55 may include a weather hood 60 mounted on an existing inlet filter house 65 for the incoming flow of air 20 to pass through. The weather hood 60 may prevent weather elements such as rain, snow, and the like from entering therein. The existing inlet filter house 65 may remove foreign objects and debris from the flow of air 20. The weather hood 60 may include a number of drift eliminators and/or coalescer pads 70. The coalescer pads 70 may reduce the content of liquids within the flow of air 20. A number of filters 68 such as pulsed air filters and the like also may be used downstream of the weather hood 60 in the existing inlet filter house 65.

The flow of air 20 then may pass through a power augmentation system 75. The power augmentation system 75 may include a chiller coil 80 and/or other types of chilling devices positioned within the existing inlet filter house 65 to chill the incoming flow of air 20. The existing inlet filter house 65 also may have a transition piece 85 with a reduced cross-section. The transition piece 85 may lead to an inlet duct 90 extending towards the compressor 15. Other components such as a silencer 95 and an inlet bleed heat system 97 also may be used. The turbine inlet air filter system 55 and the components described herein are for the purpose of example only. Other types of inlet air systems may be used herein with other components and other configurations.

Figure 3:
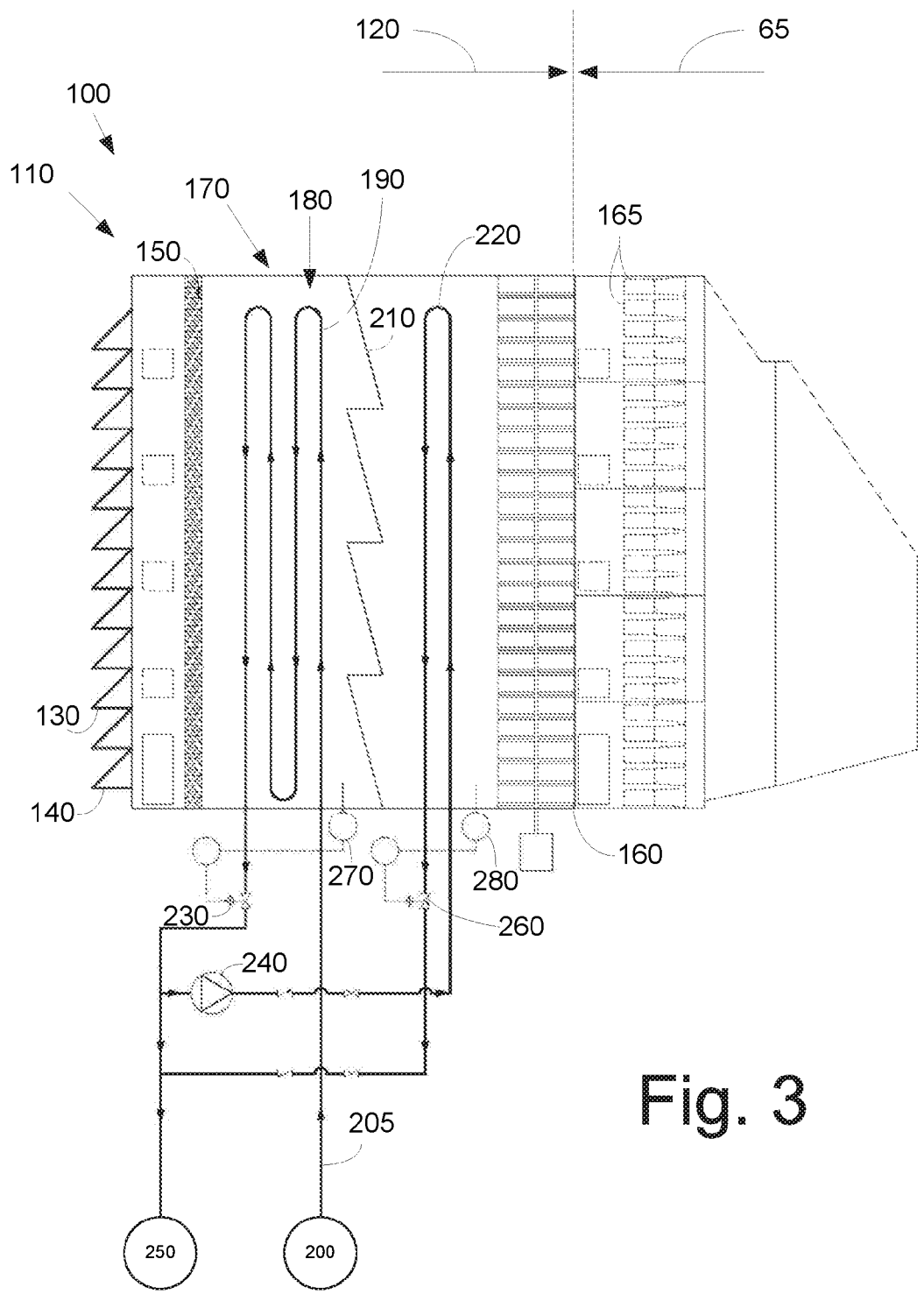
FIG. 3 is a schematic diagram of an air inlet chilling system as may be described herein.

FIG. 3 shows an example of an inlet air chilling system 100 as may be described herein. The inlet air chilling system 100 may include an inlet filter house 110. The inlet filter house 110 may be a complete component in communication with the compressor 15 of the gas turbine engine 10 in a manner similar to that described above or the inlet filter house 110 may be an inlet filter house extension 120. Specifically, the inlet filter house extension 120 may be connected directly to the existing inlet filter house 65. The use of the inlet filter house extension 120 allows for an easy retrofit without need for costly gas turbine outage and dismantling the existing inlet filter house 65. The inlet filter house extension 120 may be constructed while the gas turbine engine 10 is in operation. The inlet filter house 110 may have any size, shape, or configuration.

The inlet filter house 110 may include a weather hood 130 with a number of drift eliminators and/or coalescer pads 140 positioned about a front end thereof. The inlet filter house 110 may include one or more prefilters 150 positioned about the coalescer pads 140 or elsewhere to filter the flow of air 20. The inlet filter house 110 also may include a bypass louver 160 installed between the existing and the extended section of the inlet filter house 110. The bypass louver 160 may provide the flow of air 20 directly to the existing inlet filter house 65 so as to reduce internal pressure losses when the components of the inlet filter house 110 described herein are not in operation. Any pressure loss within the inlet filter house 110 may adversely impact the power output and efficiency of the gas turbine engine 10. A number of final filters 165 may be positioned downstream of the bypass louver 160 or elsewhere. The inlet filter house 110 and the components thereof may have any size, shape, or configuration. Other components and other configurations may be used herein.

The inlet air chilling system 100 also may include a power augmentation system 170 positioned within the inlet filter house 110. The power augmentation system 170 may include an air chilling/heating coil 180. The air chilling/heating coil 180 may be a multipass coil 190 or any type of heat transfer device. Other types of chilling systems may be used herein to chill the incoming flow of air 20 as it passes therethrough. The air chilling/heating coil 180 may have any size, shape, or configuration. Any material of construction also may be used.

The air chilling/heating coil 180 may be in communication with a water supply 200. The water supply 200 may include a flow of water 205 therein. The water supply 200 may supply chilled or hot water 205 as may be required. The water supply 200 may include a glycol/water mixture or other types of refrigerant/anti-freeze fluids. Other types of fluids also may be used herein. The inlet air system 100 may include one or more mist eliminators 210 positioned downstream of the air chilling/heating coils 180 to remove water droplets from the air stream when air moisture condenses on the coils 180 during inlet air chilling mode. The mist eliminator 210 may be of conventional design and may have any size, shape, or configuration. Other components and other configurations may be used herein.

The power augmentation system 170 also may include an energy recovery/heating coil 220 positioned downstream of the mist eliminator 210 within the inlet filter house 110. The energy recovery/heating coil 220 may have any size, shape, material, or configuration. The energy recovery/heating coil 220 may be in communication with the air chilling/heating coil 180 via a temperature control valve 230 and an energy recovery/heating coil pump 240. The energy recovery/heating coil pump 240 may be of conventional design. The energy recovery/heating coil 220 thus may warm the flow of air 20 leaving the air chilling/heating coil 180 with the heat removed by the flow of water 205 leaving the air chilling/heating coil 180. The energy recovery/heating coil 220 may be in communication with a water return 250 via a humidity control valve 260. One or more temperature sensors 270 and humidity sensors 280 also may be used herein. Other components and other configurations may be used herein.

Generally described, moist hot air 20 flows through the weather hood 130, the prefilter 150, the air chilling/heating coil 180, the mist eliminator 210, and the energy recovery/heating coil 220 to be cooled and dried before being routed into the existing inlet filter house 65 and the compressor 15. Specifically, the flow of air 20 may be cooled below its dew point when passing through the air chilling/heating coil 180. The flow of air 20 may be cooled below current inlet air temperature limits without concern for compressor icing given the following warming and dehumidification step. The flow of air 20 may be saturated such that some of the moisture in the flow of air may be condensed on the air chilling/heating coil 180. The condensate may be collected and/or disposed while the mist eliminator 210 prevents any condensate carryover. The heat absorbed from the flow of air 20 thus may raise the temperature of the flow of water 205 circulating through the air chilling/heating coils 180. The temperature control valve 230 may regulate the flow of water 205 through the air chilling/heating coils 180 so as to maintain the temperature of the flow of air leaving the coils at the desired set point.

At least a portion of the flow of spent warmed water 205 may be pumped to the energy recovery/heating coil 220 via the energy recovery/heating coil pump 240. Alternatively, hot water may be supplied from a secondary source. The cold saturated air leaving the air chilling/heating coil 180 thus may be heated in the energy recovery/heating coil 220 so as to reduce the humidity level therein. The flow of water 205 leaving the energy recovery/heating coil 220 then may be routed to the return 250. The humidity control valve 260 regulates the flow of water 205 through the energy recovery/ heating coil 220 so as to maintain the desired humidity level of the flow of air 20 leaving the coil. Maintaining the desired humidity level will ensure that no caking will develop in the final filters. The flow of air 20 leaving the power augmentation system 170 thus has both a lower temperature and lower humidity.

The inlet air chilling system 100 regulates both the temperature and the humidity ratios of the flow of air 20 entering the compressor 15 of the gas turbine engine 10. Reducing the inlet air humidity from saturated (100%) downstream of the air chilling/heating coils 180 to less than about eighty-five percent (85%) at the energy recovery/heating coil 220 minimizes issues with compressor blade corrosion and erosion. The flow of air 20 also may be cooled without concern for compressor icing given the lowering of the humidity levels. As such, the inlet air system 100 may provide for higher levels of power augmentation as compared to existing inlet air chilling/heating systems in that even with the use of the energy recovery/heating coils 220, the flow of air 20 still has an overall lower temperature.

The overall inlet air chilling system 100 may be installed in front of existing filter houses 65 so as to avoid long outages currently required for the installation of an inlet chilling/heating coil. Specifically, the inlet air chilling system 100 may be part of an overall retrofit of the gas turbine engine 10 with reduced downtime and expense. The inlet filter house extension 120 may be a pre-engineered free standing extension of the existing filter house. The inlet air chilling system 100 may be installed while the existing gas turbine engine 10 is in operation.

The inlet air chilling system 100 thus provides improved power augmentation with humidity control to avoid caking and the like during hot and humid ambient conditions. Moreover, the air chilling/heating coils 180 and the energy recovery/heating coils 220 of the inlet air chilling system 100 also provide inlet heating, defogging, and anti-icing in an overall simplified design. Both inlet heating and anti-icing processes require the water source 200 to supply hot water 205 to the inlet air chilling/heating coil 180 at a temperature higher than the temperature of the inlet air 20. Inlet heating improves the thermal efficiency of the turbine and combined cycle power plants at part-load operating conditions. Anti-icing processes heats very cold ambient air to raise the temperature above the dew point to prevent ice buildup on the filter house 110 surfaces and elements. Likewise, defogging of the inlet air may be provided without a power output penalty by initially cooling the air far below the dew point to condense the moisture content and then heating the air to reduce the humidity level.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. An inlet air chilling system for use with a compressor in a gas turbine engine, comprising:
    an inlet air filter house with a flow of inlet air therein, wherein the inlet air filter house comprises first portion and a second portion;
    a bypass louver disposed between the first portion and the second portion of the inlet air filter house;
    an air chilling/heating coil positioned within the second portion of the inlet air filter house;
    an energy recovery/heating coil positioned downstream of the air chilling/heating coil within the second portion of the inlet air filter house;
    a temperature control valve in communication with the air chilling/heating coil and a humidity control valve and a pump in communication with the energy recovery/heating coil for regulating a flow therebetween; and
    a plurality of air filter elements positioned downstream of the energy recovery/heating coil within the first portion of the inlet air filter house,
    wherein the flow of inlet air passes through the air chilling/heating coil, the energy recovery/heating coil, and the plurality air filter elements in sequence before being supplied to the compressor,
    wherein a flow of chilled water within the air chilling/heating coil exchanges heat with the flow of inlet air to bring a temperature of the flow of inlet air to below an inlet air dew point temperature,
    wherein a portion of the flow of chilled water leaving the air chilling/heating coil after being warmed by the flow of air is routed to the energy recovery/heating coil to heat the flow of air to lower a relative humidity of the flow of air from about 100% to about 85% to prevent wetting and caking the plurality of air filter elements,
    wherein the bypass louver bypasses the flow of inlet air directly to the first portion of inlet air filter house so as to reduce internal pressure losses when the air chilling/heating coil and the energy recovery/heating coil in the second portion of the inlet air filter house are not in operation.

2. The inlet air chilling system of claim 1, wherein the first portion comprises an existing inlet air filter house disposed downstream of the second portion, which comprises an inlet air filter house extension.

3. The inlet air chilling system of claim 1, wherein the air chilling/heating coil comprises a multi-pass coil.

4. The inlet air chilling system of claim 1, further comprising a mist eliminator positioned within the second portion of the inlet air filter house between the air chilling/heating coil and the energy recovery/heating coil to remove and dispose of any airborne condensate water droplets generated in the air chilling/heating coil.

5. The inlet air chilling system of claim 1, further comprising a chilled or hot water supply corresponding to a selected chilling or heading mode of operation in communication with the air chilling/heating coil.

6. The inlet air chilling system of claim 1, further comprising an energy recovery/heating coil pump positioned between the air chilling/heating coil outlet and the energy recovery/heating coil inlet to supply the energy recovery/heating coil with warmed water leaving the air chilling/heating coil.

7. The inlet air chilling system of claim 1, wherein the air chilling/heating coil and the energy recovery/heating coil collectively form a power augmentation system.

8. The inlet air chilling system of claim 1, wherein the inlet air filter house comprises one or more temperature sensors in communication with the temperature control valve and one or more humidity sensors in communication with the humidity control valve.

9. The inlet air chilling system of claim 1, further comprising a weather hood installed in front of the second portion of the inlet air filter house.

10. The inlet air chilling system of claim 9, further comprising one or more pre-filters disposed within the second portion of the inlet air filter house downstream of the weather hood and upstream of the air chilling/heating coil.

* * * * *